Aug. 28, 1934.  V. E. PRATT  1,971,504
SEED PRODUCT AND PROCESS OF MAKING SAME
Filed Jan. 23, 1933   2 Sheets-Sheet 1
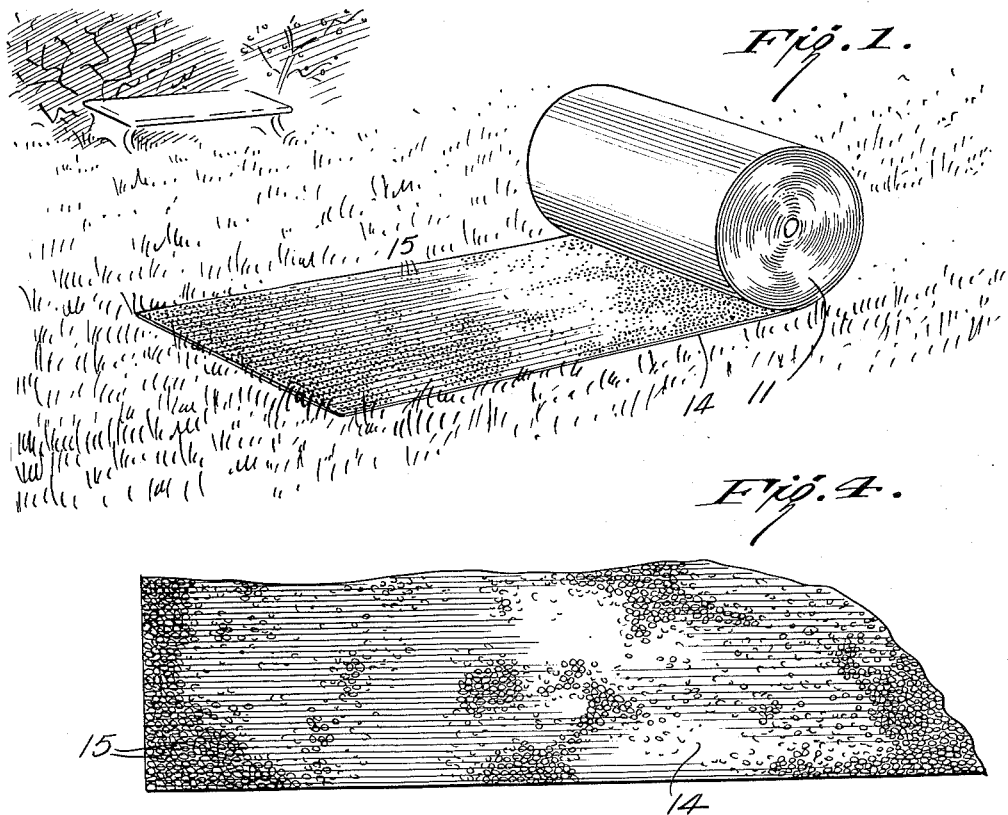
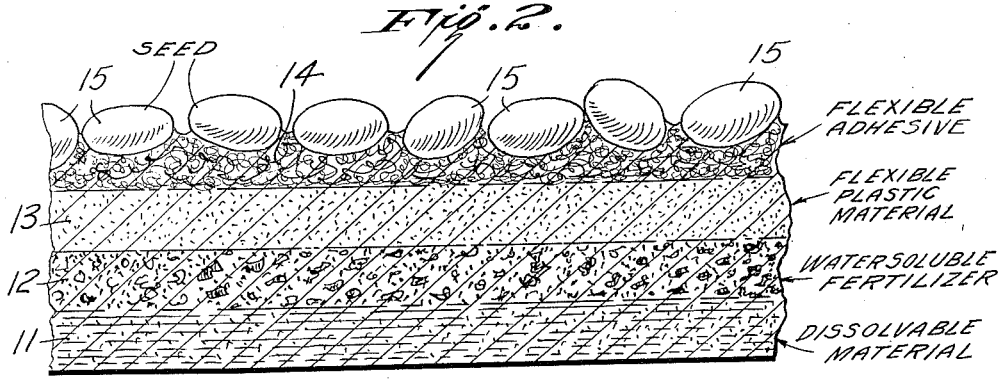
INVENTOR
VERNEUR E. PRATT,
BY
ATTORNEY Aug. 28, 1934.　　　　V. E. PRATT　　　　1,971,504
SEED PRODUCT AND PROCESS OF MAKING SAME
Filed Jan. 23, 1933　　2 Sheets-Sheet 2
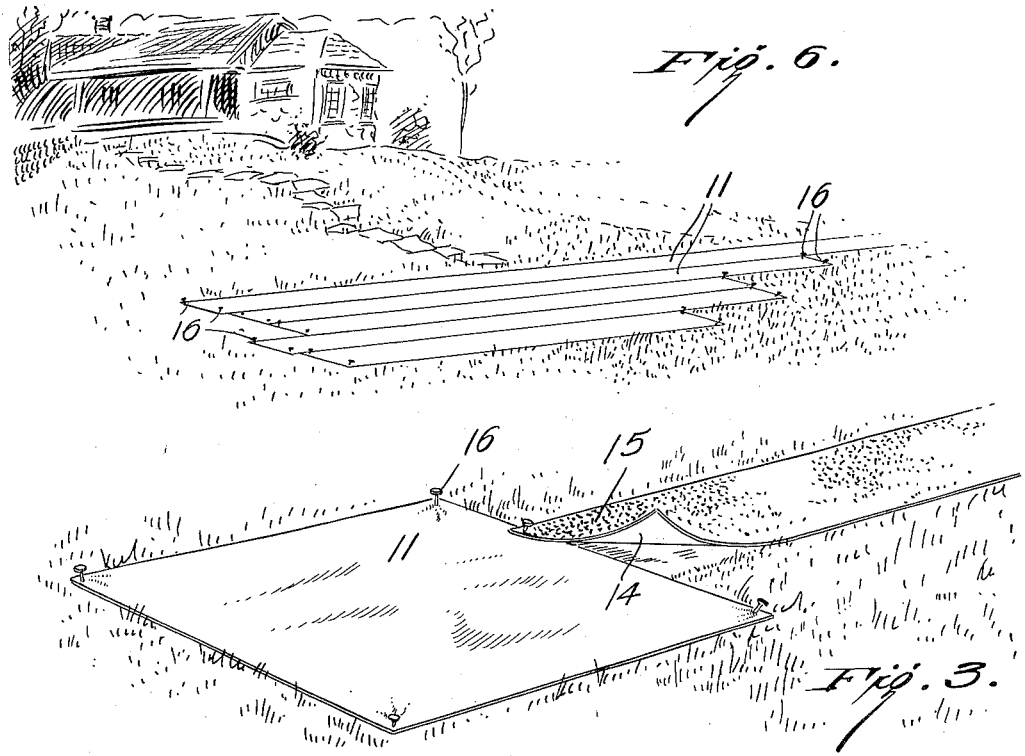
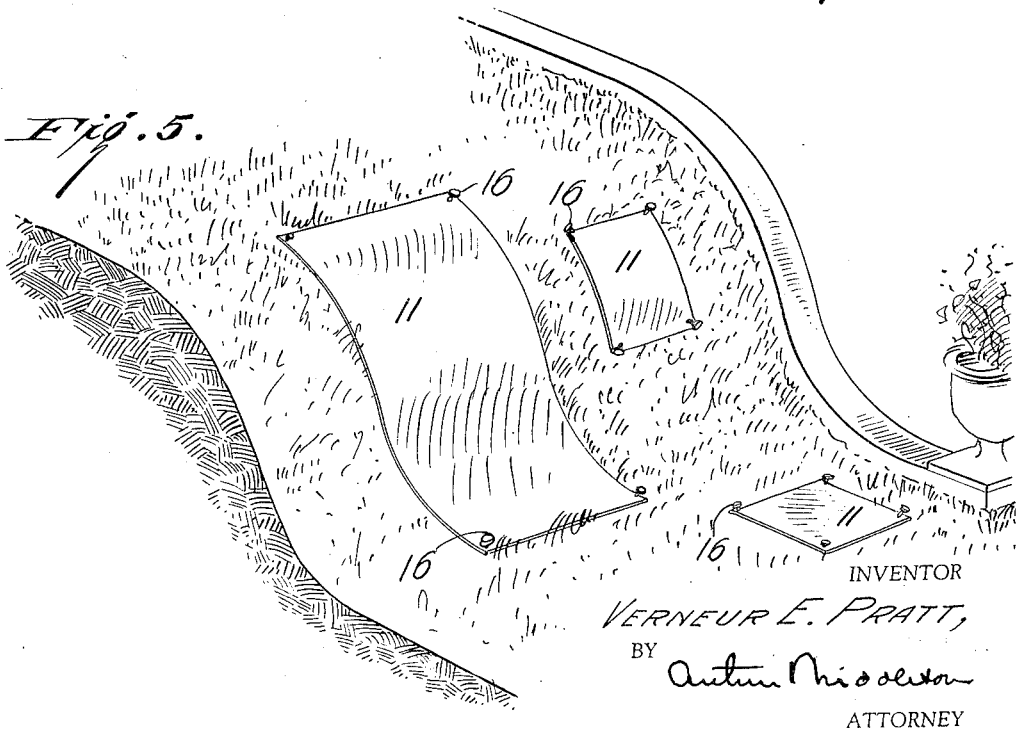
INVENTOR
VERNEUR E. PRATT,
BY
Arthur Middleton
ATTORNEY Patented Aug. 28, 1934

1,971,504

UNITED STATES PATENT OFFICE 1,971,504

SEED PRODUCT AND PROCESS OF MAKING SAME

Verneur E. Pratt, Plandome, N. Y.

Application January 23, 1933, Serial No. 653,029

4 Claims. (Cl. 47—56)

This invention relates to the seeding or planting of seeds. More particularly it has to do with grass-seeding. One object is to provide a complete, self-contained lawn-making product which can be sold as an article of trade and used by the buyer with a minimum of labor. A further object is to provide this product with all the essentials except moisture for rapid germination and substantial growth of the grass. Another object is to protect the seeds during germination and growth from injury due to fowls and birds scratching or eating them; to trampling thereof by man and beast; and to dispersal thereof by wind and rain.

The principle of the invention may be said to reside in a disintegrable backing or reinforcement which carries water-soluble fertilizer and the seeds in a manner whereby the fertilizer is maintained out of contact with the seeds until the seeding product has been placed in growing position, and whereby the seeds have access to air. The sheets or strips of this seeding product, if made flexible, can be sold in rolls and easily spread over the area to be seeded by the buyer without substantial labor so that previous experience is unnecessary. The seeded sheets are spread over the old lawn, or place to be newly planted, tacked to the ground with preferably wooden pegs, sprinkled and nature does the rest. Germination shortly takes place with the roots growing down into the soil while the blades of grass grope skyward. The seeds can be applied to the backing evenly by machine and so can the base of fertilizer or the like. The thickly and evenly distributed seeds avoid the possibility of the non-seeded spots in a hand seeded lawn. Moreover, the grass grows so thickly from the closely adjacent seeds that practically all weeds are choked out before they have a chance to sprout. The seeds stay embedded in the sheet until germination thereof since rains cannot wash them away and birds cannot eat them.

Terraces and slopes ordinarily sodded because of the lack of any practicable way to keep rains from washing the seeds away therefrom can be planted with grass by means of this sheeted seed planting product. The fertilizer carried by the sheeting is of high analysis and is carefully selected for grass growing; is concentrated; and in water soluble form to be quickly available to the young grass roots insuring a quickly obtained healthy stand of grass. The backing which serves as the carrier for the seeds and fertilizer, acts as a binder for holding the young roots in place and against injury until they form a solid substantial sod. This backing or sheeting also serves as a mulch whereby the seeds are assured of sufficient moisture from the soil since the sun cannot bake it. Also with this backing as a protection for the tender sprouts the lawn can be mowed early and walked on without damage thereto.

The invention possesses other objects and features of advantage, some of which, with the foregoing, will be set forth in the following description of the invention. In the accompanying drawings, there is illustrated the best embodiment of my invention known to me but such embodiment is to be regarded as illustrative only of many embodiments so the invention is not limited thereto.

Figure 1 of the drawings shows perspectively a view of a roll of the seeding product of this invention. Figure 2 shows an enlarged sectional view taken through a strip or sheet of the lawn product to show the various layers and their relative relationships. Figure 3 shows a strip of the lawn planting product in place with grass growing therefrom.

Fig. 4 shows a plan view of a strip of the seeding product-seed side up. Fig. 5 shows how the seeding product may be used on an embankment. Fig. 6 shows an entire lawn being seeded by the use of this invention.

The manner of carrying out this invention may be described by saying that there is provided a flexible and permeable sheet of backing material 11 that is slowly disintegratable or dissolvable when exposed to the weather. Paper may be used for this backing or paper reinforced with threads. Cotton netting however has proved satisfactory since the function of the backing sheet is to serve as a carrier for the seeds that is flexible enough to be rolled up; that can be permeated by moisture and by the sprouts from the seeds. Adhering to the backing sheet 11 is a layer of water soluble fertilizer 12 selected to be appropriate for the seeds being planted. This layer should be flexible too, so it is preferably formed by applying the fertilizer in liquid or plastic condition to the backing sheet or strip and letting it dry and harden thereon. Adhering to the fertilizer layer 12 is a breaker strip or layer 13 formed of corn dextrin, casein, silicate of soda or any plastic material that is flexible whose principal function is to keep the acidity of the fertilizer layer 12 from adversely affecting the seeds. Adhering to the breaker strip 13 is a layer of flexible adhesive material 14 which for instance may be casein, gelatin or glue. In this adhesive layer are projectingly held the seeds 15. It is to be noted that the seeds while being imbedded in the adhesive are not encased thereby for it is important that the seeds have access to the air, or else after a time in storage they will die.

By having the seeds project from the adhesive seed-holding layer 14, they not only have access to the air but when the lawn making sheet or strip is rolled up as shown in Figure 1, the projecting seeds serve as spacers to keep the next adjacent face of the lawn product from coming into too close contact therewith to shut out too much air from the seed layer.

In operation, strips of the lawn making product are laid over the area to be seeded and held in place by pegs 16 such as wooden golf tees, or toothpicks, or by weights. The sprouting of the seeds will be hastened if the strips are watered. The strips may be applied with the seed layer on the bottom adjacent the ground, if there is likely damage thereto expected from animal or fowl. Otherwise, the strip is applied with the seed layer on top, since germination in this position is facilitated. The latter position is preferable since with this arrangement, the seed-roots penetrate the seed-carrier or netting which is quickly matted and forms what is in effect, sod. The soil under the strips needs no preliminary treatment such as plowing or rolling for it is readily permeated by the seed roots. If there is any old grass in the ground being newly planted, it does not need to be removed, since the strips kill the grass or weeds thereunder.

If there are bare spots in the lawn to be reseeded, a piece of the lawn making product is cut slightly larger than the bare spot and secured in place over the spot. The piece is then watered and germination will take place shortly.

The watering or moistening of the strip slowly dissolves the water-soluble fertilizer layer which percolates downwardly and is a source of food supply for the seeds which becomes available at an appropriate time. The sheets or strips act as a mulch to prevent the ground thereunder from being baked or parched by the sun and thus provide moisture in the top of the soil for the seed-roots. The uniform spreading of the seeds on the carrier prevent weed-growth since by their very closeness they will crowd it out.

The lawn making product being made in strips or sheets can be sold by the square foot or square yard, or in rolls. The invention may be used in connection with other than grass seed although it lends itself particularly to the planting of seed over a substantial area where a uniform distribution of the seed is desired. While it is much preferred to have fertilizer carried by the strip or sheet as well as the seeds, it is conceivable that under certain conditions the fertilizer layer may be omitted. Similarly, while a flexible sheeting of paper or netting is desirable since it lends itself to bending into a roll for easier transportation, the carrier could be made stiff and non-flexible.

I claim:

1. An article of manufacture comprising a seed carrier, an adhering fertilizer, layer thereon, and a layer of seeds carried by the carrier maintained out of contact with the fertilizer layer.

2. The process of making a seeding product comprising securing to a flexible sheet a layer of fertilizer, protecting the fertilizer layer with a breaker strip, applying an adhesive layer to the breaker strip, and fastening seeds in the adhesive layer.

3. A strip of seeding material comprising a layer of water soluble fertilizer, a layer of seeds arranged so as to have access to air, and a disintegrating medium serving to connect the seeds and the fertilizer but in a manner to hold the seeds spaced from the fertilizer until after the seeding material has been applied to the soil for use.

4. A strip of seeding material according to the claim last preceding in which there is a layer of protecting material that is applied to the fertilizer on the face of the fertilizer layer remote from the seeds.

VERNEUR E. PRATT.